(12) United States Patent
Nguyen et al.

(10) Patent No.: US 6,715,038 B1
(45) Date of Patent: Mar. 30, 2004

(54) EFFICIENT MEMORY MANAGEMENT MECHANISM FOR DIGITAL SIGNAL PROCESSOR AND METHOD OF OPERATION THEREOF

(75) Inventors: Hung T. Nguyen, Plano, TX (US); Mark A. Boike, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 220 days.

(21) Appl. No.: 09/993,431

(22) Filed: Nov. 5, 2001

(51) Int. Cl.[7] .............................................. G06F 13/00
(52) U.S. Cl. ...................................... 711/125; 711/145
(58) Field of Search ................................. 711/125, 145

(56) References Cited

U.S. PATENT DOCUMENTS

| | | | | |
|---|---|---|---|---|
| 5,276,848 A | * | 1/1994 | Gallagher et al. | 711/121 |
| 5,440,747 A | * | 8/1995 | Kiuchi | 710/267 |
| 5,530,804 A | * | 6/1996 | Edgington et al. | 714/30 |
| 5,694,553 A | * | 12/1997 | Abramson et al. | 712/23 |
| 5,832,258 A | * | 11/1998 | Kiuchi et al. | 712/226 |
| 6,161,208 A | * | 12/2000 | Dutton et al. | 714/764 |

* cited by examiner

Primary Examiner—Reba I. Elmore
(74) Attorney, Agent, or Firm—Hitt Gaines PC

(57) ABSTRACT

For use in a processor having an instruction cache, an instruction memory and an external synchronous memory, a memory management mechanism, a method of managing memory and a digital signal processor incorporating the mechanism or the method. In one embodiment, the mechanism includes an external memory request abort circuit coupled to the external synchronous memory and an instruction cache invalidator associated with the external memory request abort circuit. In this embodiment, the external memory request abort circuit aborts a request to load an instruction from the external synchronous memory before the information is loaded into the instruction cache. Additionally, the instruction cache invalidator invalidates the instruction cache when address spaces of the instruction memory and the external synchronous memory overlap and the processor switches between the instruction memory and the external synchronous memory.

17 Claims, 5 Drawing Sheets

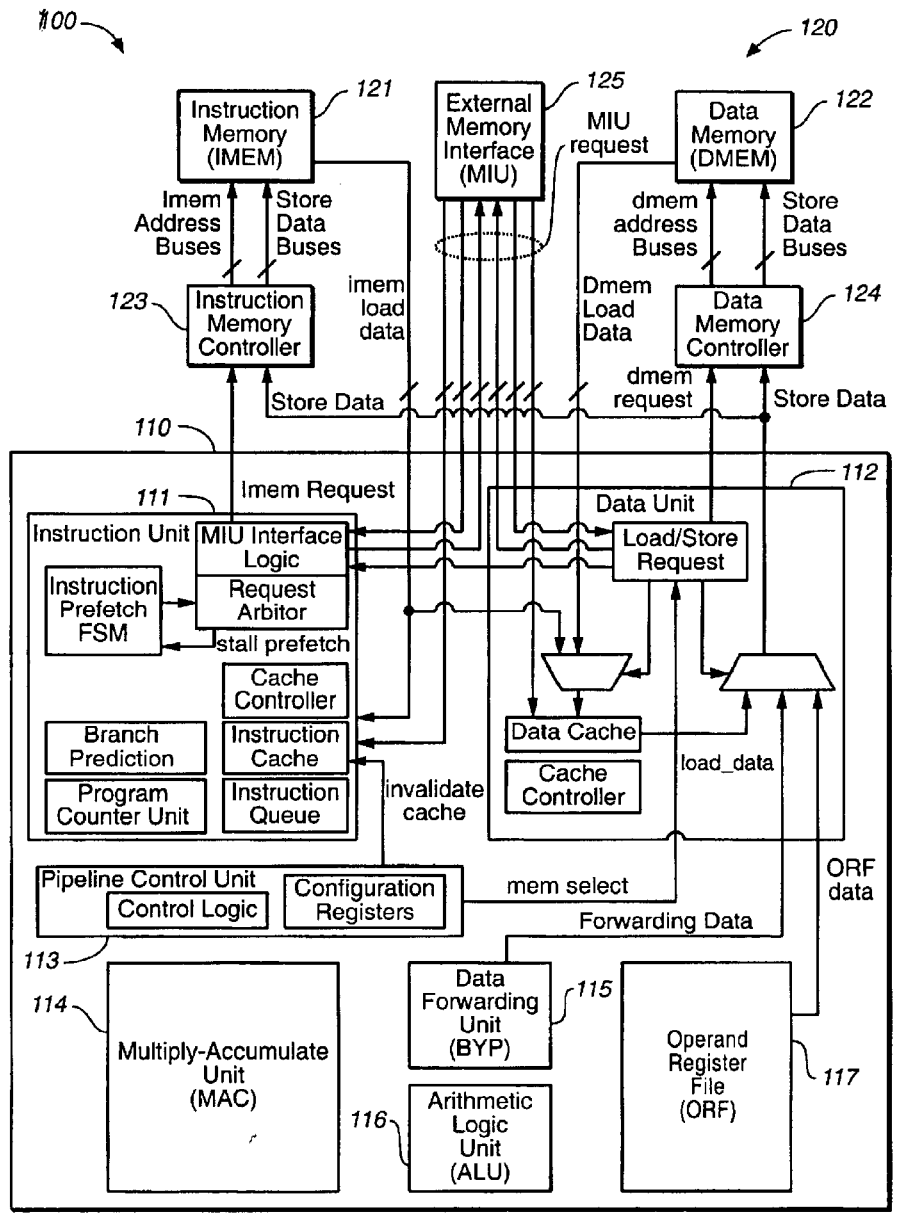
FIG._1

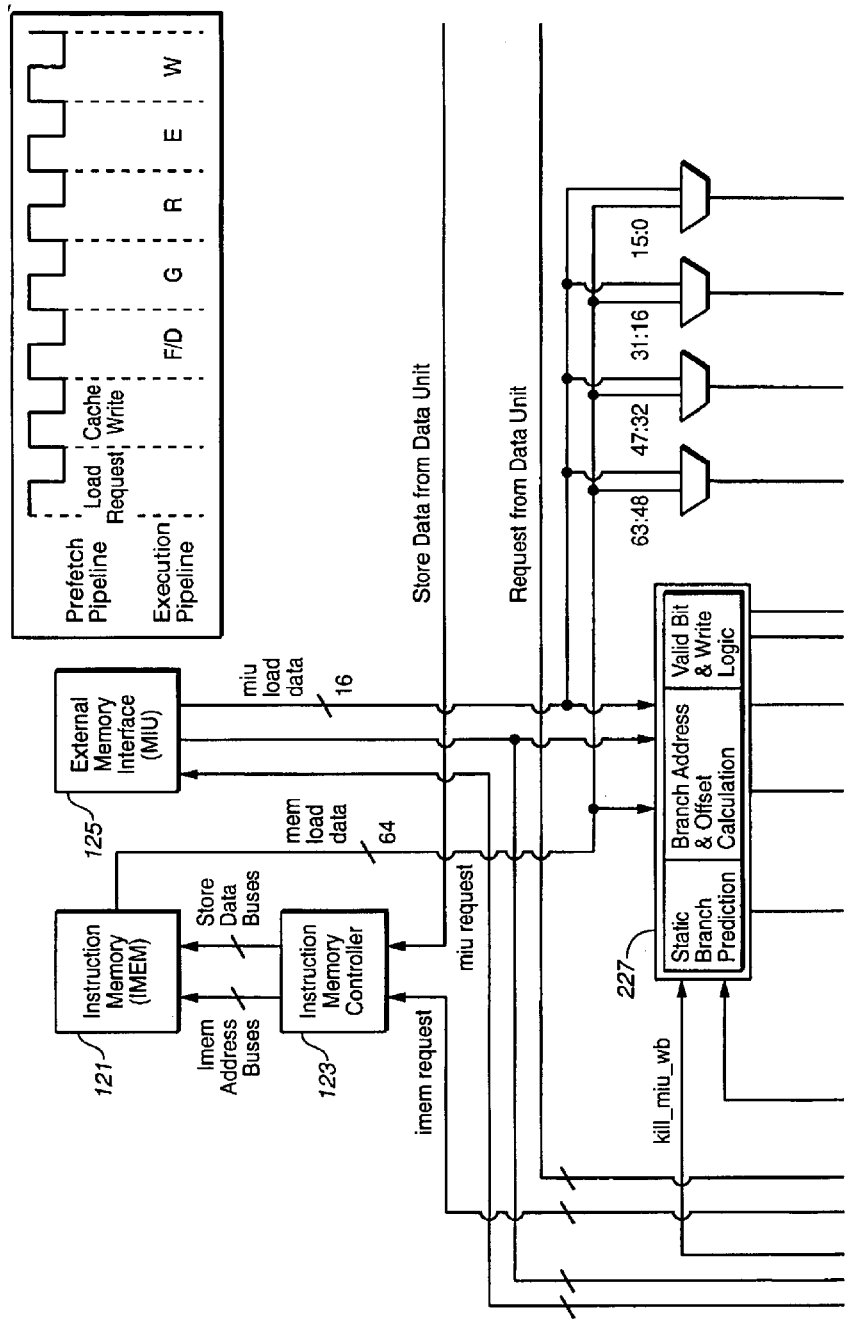
FIG._2A

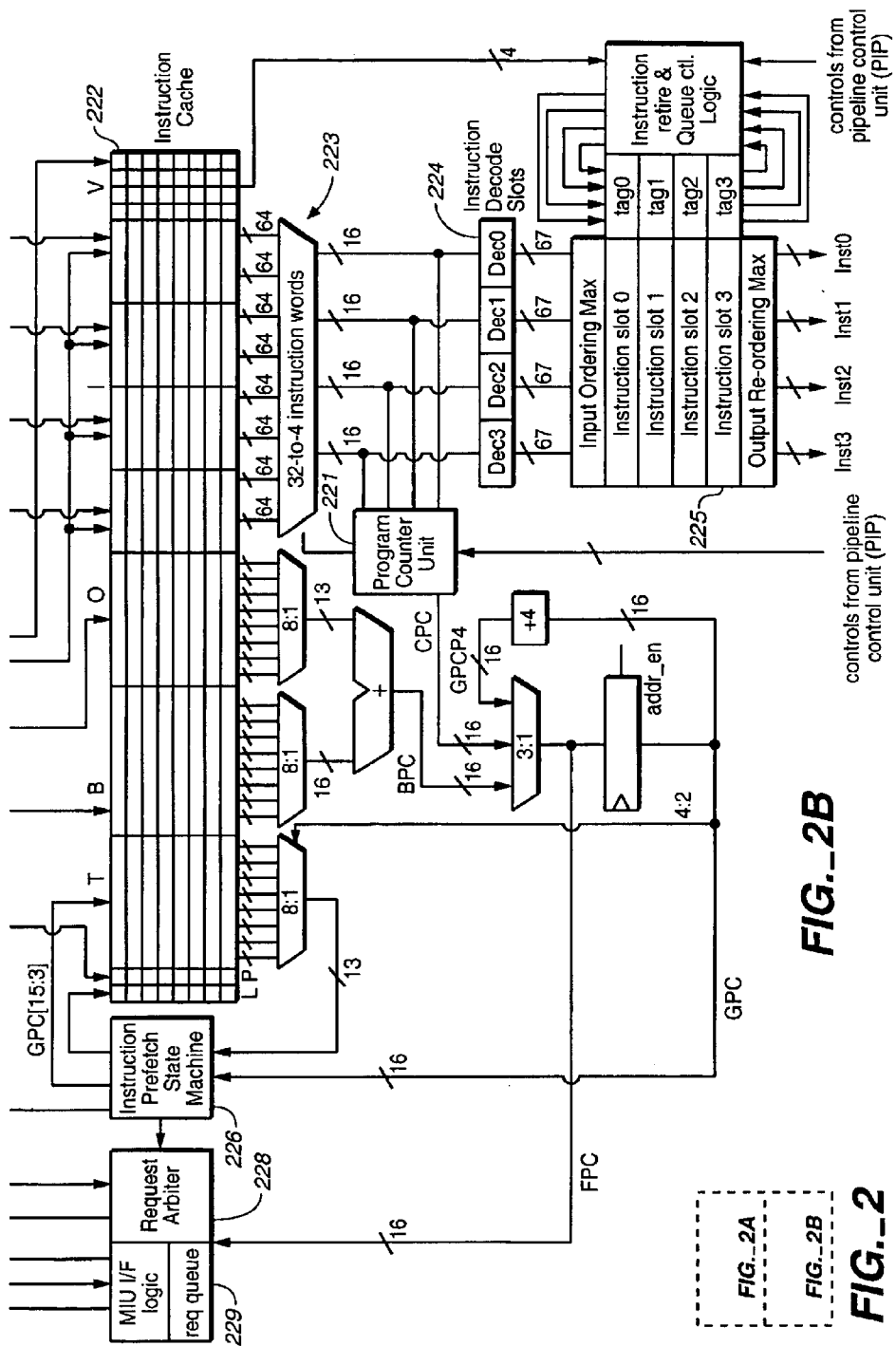

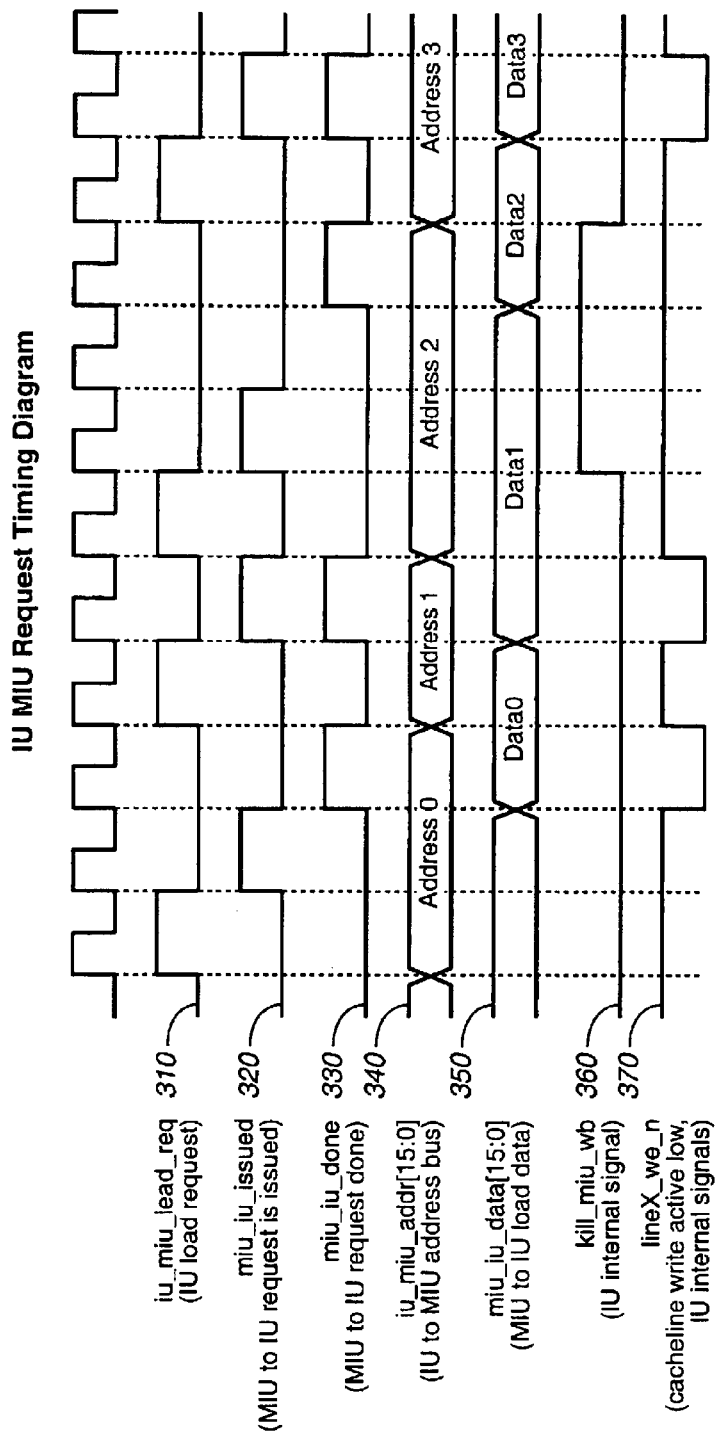
FIG._3

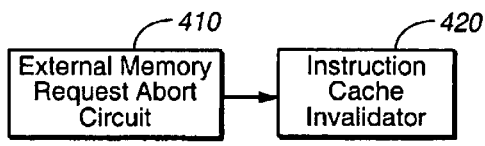
FIG._4
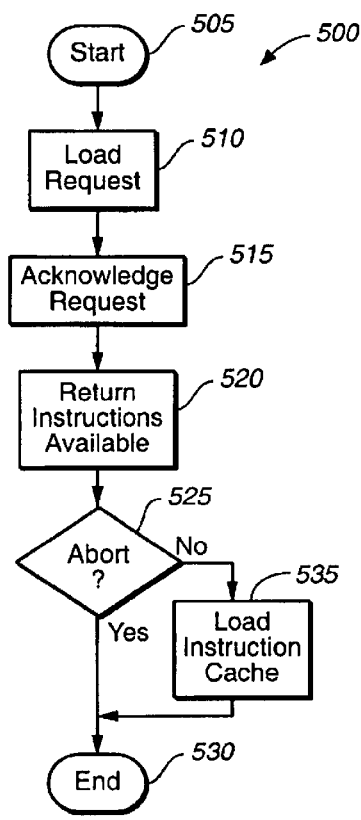
FIG._5A
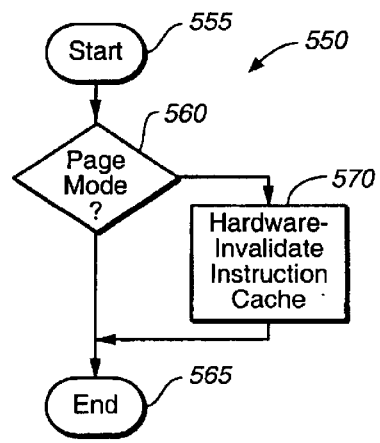
FIG._5B

EFFICIENT MEMORY MANAGEMENT MECHANISM FOR DIGITAL SIGNAL PROCESSOR AND METHOD OF OPERATION THEREOF

TECHNICAL FIELD OF THE INVENTION

The present invention is directed, in general, to digital signal processors (DSPs) and, more specifically, to an efficient memory management mechanism for a DSP and a method of prefetching instructions for execution in a DSP.

BACKGROUND OF THE INVENTION

Over the last several years, DSPs have become an important tool, particularly in the real-time modification of signal streams. They have found use in all manner of electronic devices and will continue to grow in power and popularity.

Those skilled in the art are familiar with DSP architecture in general. Conventional DSPs employ a pipeline through which pass data representing a signal to be processed. An execution core performs various mathematical and logical operations on the data to effect changes therein. Memory is coupled to the execution core. The memory contains not only instructions concerning the way in which the data are to be modified, but also further data that may be employed in conjunction with executing the instructions.

It becomes important at this point to discuss two details with respect to the way in which DSP memory may be architected. First, two fundamental DSP architectures exist that are distinguished from one another by how they interact with memory. So-called "von Neumann" architecture DSPs unify instructions and data in a single memory and a single bus. So-called "Harvard" architecture DSPs split instructions and data between two separate memories and buses. The tradeoff is simplicity (von Neumann) versus speed (Harvard).

Second, more sophisticated DSPs stratify memory in an effort to balance speed, cost and power consumption. In a perfect and simple world, a DSP's memory would be extremely fast, low power, arbitrarily large and on the same physical substrate. Unfortunately, very fast memory is very expensive and requires lots of power and arbitrarily large memory takes an arbitrarily large amount of room on a given substrate. Tempering those requirements with today's commercial concerns regarding both chip and system cost, flexibility and power consumption, modern DSP architecture calls for memory to be stratified, perhaps into three or more layers.

Assuming for the moment that three layers are desired, those might be (1) an extremely small, fast cache, located on the same physical substrate as the processing core of the DSP, that contains very little, but highly relevant instructions or data, (2) a somewhat larger, somewhat slower memory, still located on the same physical substrate as the processing core of the DSP, that contains relevant instructions or data and (3) an external memory that is as large as need be to contain the entirety of a program and data that the DSP is to use, but that is located on a separate physical substrate and accessible only through a comparatively slow external memory interface. While keeping the external memory on a separate substrate increases flexibility in system design and allows the DSP's chip size to remain small, external memory requires its own power. Therefore, every external memory access comes at the cost of some power consumption that should be minimized in power-consumption-sensitive (typically battery-powered) systems. It should also be noted that processors of all types, including ubiquitous microprocessors, employ the same stratification strategy to balance their speed and cost goals.

Given this memory stratification, designers have set about for years to increase performance by developing a number of schemes to avoid latencies and power consumption associated with gaining access to more distant echelons of memory for purposes of loading instructions or loading and storing data. Intelligent guesses concerning instructions and data that may be useful in the near future can be employed to great advantage to retrieve ahead of time (or "prefetch") such instructions or data into faster memory. As effective, as prefetching is, more can be done to reduce the bottlenecks that exist between a digital signal processor and its off-chip external memory.

Accordingly, what is needed in the art is a better way to manage stratified memory to increase processor performance. More specifically, what is needed is a mechanism to improve overall DSP performance.

SUMMARY OF THE INVENTION

To address the above-discussed deficiencies of the prior art, the present invention provides, for use in a processor having an instruction cache, an instruction memory and an external memory, a memory management mechanism, a method of managing memory and a digital signal processor incorporating the mechanism or the method. In one embodiment, the mechanism includes: (1) an external memory request abort circuit, coupled to the external memory interface, that aborts a request to load an instruction from the external memory before the information is loaded into the instruction cache and (2) an instruction cache invalidator, associated with the external memory request abort circuit, that invalidates the instruction cache when address spaces of the instruction memory and the external memory overlap and the processor switches between the instruction memory and the external memory.

The present invention therefore introduces a mechanism that reduces the bottlenecks existing in conventional processors that employ external memory. As previously described, those bottlenecks are caused by limited external memory speed and external memory bus bandwidth. The present invention addresses these limitations by avoiding unnecessary loads and by easing the switch between internal instruction memory and external memory. More specifically, the present invention aborts unnecessary loads when advantageous to do so, and employs a hardware scheme to invalidate the instruction cache when necessary to do so. Using hardware, rather than a software routine, to invalidate the instruction cache frees the DSP to perform other tasks concurrently with the invalidation and thereby improves the overall performance of the DSP.

In one embodiment of the present invention, the external memory is synchronous memory. Those skilled in the art will understand, however, that other forms of external memory may benefit from application of the present invention.

In one embodiment of the present invention, the mechanism further includes an instruction prefetch mechanism that prefetches instructions from a selected one of the instruction memory and the external memory into the instruction cache. As described above, prefetching can be employed to avoid latencies normally associated with loads from slower memory. The present invention can advantageously be used with prefetching, although this need not be the case.

In one embodiment of the present invention, the instruction cache is direct mapped. A direct mapped instruction cache offers certain architectural advantages, primarily simplicity. Of course, other cache architectures are within the broad scope of the present invention.

In one embodiment of the present invention, the external memory request abort circuit is associated with a request arbiter in the processor. The request arbiter arbitrates requests from a data unit and an instruction unit of the processor. Of course, this need not be the case.

In one embodiment of the present invention, the instruction cache invalidator comprises a programmable control register. Alternatively, the cache invalidator may assert a signal directly into the instruction cache to flush it. All hardware means of invalidating the instruction cache are within the broad scope of the present invention.

In one embodiment of the present invention, the processor is a digital signal processor. The teachings and principles of the present invention may, however, be applied to processors in general, including microprocessors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 1 illustrates an exemplary DSP which may form an environment within which a memory management mechanism constructed according to the principles of the present invention can operate;

FIG. 2 illustrates an instruction unit within the exemplary DSP of FIG. 1 within which a memory management mechanism constructed according to the principles of the present invention can more specifically operate;

FIG. 3 illustrates a timing diagram of signals associated with a memory management mechanism constructed according to the principles of the present invention;

FIG. 4 illustrates a block diagram of a memory management mechanism constructed according to the principles of the present invention; and FIGS. 5A and 5B illustrate flow diagrams of a method of managing memory carried out according to the principles of the present invention.

DETAILED DESCRIPTION

Referring initially to FIG. 1, illustrated is an exemplary DSP, generally designated 100, which may form an environment within which a memory management mechanism constructed according to the principles of the present invention can operate. Although the DSP 100 will now be described, those skilled in the pertinent art should understand that, apart from the novel memory management mechanism, the DSP 100 is essentially conventional. Those skilled in the pertinent art should also understand that the memory management mechanism can operate within the confines of other conventional or later-discovered DSP or general-purpose, non-DSP, processor architectures.

The DSP 100 contains an execution core 110 and a memory unit 120 that are located on the same physical substrate. The execution core 110 contains an instruction unit 111. The instruction unit 111 is responsible for ensuring that instructions are properly decoded, fetched, tracked and queued for execution. Besides containing control circuitry for performing these functions, the instruction unit 111 contains an instruction cache to allow instructions to be fetched as a batch and executed sequentially, thereby avoiding latencies that would be encountered were each instruction to be retrieved from memory individually. Inasmuch as the memory management mechanism of the present invention is directed to increasing the overall speed of instruction retrieval, the instruction unit 111 is the preferred place for locating the memory management mechanism.

The execution core 110 also contains a data unit 112. The data unit 112 is responsible for managing data transfer (loads and stores) between memory and register storage (to be discussed below). The data unit 112 also contains a data cache that allows data to be loaded or stored as a batch.

In a normal operating environment, the DSP 100 operates on a stream of data. Accordingly, the execution core 110 of the DSP 100 is adapted to receive the data stream into a pipeline (not shown, but comprising several stages). The pipeline is under control of a pipeline control unit 113. The pipeline control unit 113 is responsible for moving the data stream through the pipeline and for ensuring that the data stream is operated on properly. Accordingly, the pipeline control unit 113 coordinates the instruction unit 111 and the data unit 112 to ensure that instructions and their corresponding data are synchronized with the data stream in the pipeline.

Several ancillary units assist in the execution of instructions. A multiply-accumulate unit 114 performs multiplication and division calculations and calculations that are substantially based on multiplication or division. A data forwarding unit 115 ensures that results of earlier data processing in the execution core 111 are available for subsequent processing without undue latency. An arithmetic logic 116 unit performs all other general mathematical and logical operations (such as addition, subtraction, shifting, rotating and Boolean operations) that the multiply-accumulate unit 114 is not called upon to do. Finally, an operand register file 117 provides extremely fast, flexible registers that store operands being processed.

The memory unit 120 contains the so-called "local memory" that, while slower than the instruction cache of the instruction unit 111, the data cache of the data unit 112 or the registers contained within the operand register file 117, is nonetheless substantially faster than external memory (not shown, but conventional and not located on the same physical substrate as the DSP 100). The memory unit 120 contains both instruction memory 121 and data memory 122. The instruction memory 121 is managed by an instruction memory controller 123, while the data memory 122 is managed by a data memory controller 124. An external memory interface 125 can be coupled to external memory.

The memory architecture of the DSP 100 is typical of conventional DSPs and microprocessors. That is, its registers are fast but small; its instruction and data caches are larger, but still inadequate to hold more than a handful of instructions or data; its instruction memory 121 and data memory 122 are larger still (64 kilobytes, in the case of the instruction memory 121), but may be inadequate to hold an entire program. Thus, the external memory may be ultimately required to hold the entirety of a program which may be desired to execute in the DSP 100. Unfortunately, as described above, the external memory has significant load and store latencies associated with it. An object of the present invention is to reduce the bottlenecks that are ordinarily encountered when retrieving instructions from the external memory.

Since the memory management mechanism best resides within the instruction unit 111, the structure and function of the instruction unit 111 will now be set forth in greater detail. Accordingly, turning now to FIG. 2, illustrated in greater detail is the instruction unit 111 within the DSP of FIG. 1 within which a memory management mechanism constructed according to the principles of the present invention can more specifically operate.

The instruction unit 111 interacts with, among other things, the instruction memory 121, the instruction memory controller 123 and the external memory interface 125, all of FIG. 1. Under ultimate control of a program counter unit 221, the instruction unit 111 loads instructions from either the instruction memory 121 or the external memory via the external memory interface 125. The instructions (which are each 16 bits wide) and associated tags and addresses (which will be explained in greater detail below) are loaded four-wide into an instruction cache 222.

The instruction cache 222 has an eight-line, 64-bit-wide instruction space that holds a line of four, 16-bit instructions side-by-side. The instruction cache 222 further provides, for each line of instructions, control space for a cache line valid bit L, a static branch predicted taken bit P, 13 cache tag bits, 16 branch instruction base address bits, 13 branch instruction offset bits and four word valid bits. Control logic 227 (including static branch prediction logic, branch instruction base address and offset calculation logic and valid bit and write logic) provides most of the bits that occupy the control space in each line of the instruction cache 222.

Selection logic 223 is driven to select one of the instruction cache's eight lines of instructions for execution. The control space associated with that line is employed to govern subsequent handling of the associated instructions as they are decoded (in decode slots 224) and loaded into instruction slots 225 for ultimate execution.

FIG. 2 further illustrates an instruction prefetch state machine 226. The instruction prefetch state machine 226 takes, as its inputs, tag bits from a selected line in the instruction cache 222 and a program counter value derived from the program counter unit 221. The instruction prefetch state machine 226 produces, as its outputs, data to drive the static branch prediction logic within the control logic 227, a portion of the program counter value as cache tag bits, the cache line valid bit and data to drive a request arbiter 228 (which, in turn, decides how memory load requests are to be routed).

Turning now to FIG. 3, and with continued reference to FIGS. 1 and 2, illustrated is a timing diagram of signals associated with a memory management mechanism constructed according to the principles of the present invention. The external memory interface 125 is a stallable memory interface. Load requests are sent from the instruction unit 110 to the external memory interface 125 via a simple 1-deep request queue 229 and employing an iu_miu_addr address bus 340 (not shown in FIG. 1 or 2, but extending from the instruction unit 110 to the external memory interface 125).

In the illustrated DSP 100, a load request can be generated every other clock cycle. To perform a load, a signal iu_miu_load_req 310 is asserted. In response, the external memory interface 125 asserts a signal miu_iu_issued 320 to acknowledge the request. When return instructions are available, the external memory interface 125 asserts a signal miu_iu_done 330 and concurrently places the associated instructions on an miu_iu_data data bus (not shown, but extending from the external memory interface 125 to the instruction unit 110).

Turning now to FIG. 4, and with continuing reference to FIGS. 1 and 2 as necessary, illustrated is a block diagram of a memory management mechanism, generally designated 400, constructed according to the principles of the present invention. The mechanism includes an external memory request abort circuit 410. The external memory request abort circuit 410 is coupled to the external memory interface (125 of FIG. 1 or 2) and is designed to abort requests to load instructions from the external memory before the information is actually loaded into the instruction cache (222 of FIG. 2).

The flow of a program may radically change during its execution. For example, a branch may be taken or not taken or an interrupt may be asserted without prior warning. Since the DSP 100 is designed to anticipate which instructions will be needed and prefetch them whenever possible, the DSP 100 needs to accommodate a last-second change in execution. More specifically, requests for instructions from external memory no longer needed should be aborted to save external memory bus bandwidth, and any instructions no longer needed should be purged before overwriting instructions in the instruction cache. Accordingly, the external memory request abort circuit 410 detects unanticipated changes in the program counter and responds by signaling the external memory interface (125 of FIG. 1) to abort any pending requests for instructions from the external memory.

Turning back briefly to FIG. 3, and as stated above with reference to FIG. 1, when return instructions are available the external memory interface 125 asserts the signal miu_iu_done 330 and concurrently places the associated instructions on the miu_iu_data data bus 340 (not shown in FIG. 1 or 2, but extending from the external memory interface 125 to the instruction unit 110). If the request is not marked as an aborted request, the return instructions are written into the correct locations in the instruction cache 222 in the same clock cycle. Once the instructions enter the instruction cache 222, it remains there until being replaced (typically via prefetch).

If the request is marked as aborted (via assertion of a kill_miu_wb signal 360), the fetched instructions are never routed to the instruction cache 222 and the instruction cache remains write-disabled (a lineX_we_n signal 370). Conditions under which a request to load instructions from the external memory should be aborted include a branch mispredict, an interrupt taken, an unconditional jump or a branch target address update.

FIG. 4 also shows an instruction cache invalidator 420. The instruction cache invalidator 420 is associated with the external memory request abort circuit 410 and invalidates the instruction cache (222 of FIG. 2) when address spaces of the instruction memory 121 and the external memory overlap and the DSP 100 switches between the instruction memory 121 and the external memory. To describe this operation in greater detail, an operational mode of the DSP 100 calls for the instruction memory 121 and the external memory to act as pages. Recall that in the illustrated embodiment, the instruction memory 121 is 64 kilobytes. The external memory may be, for example, twice that size:

128 kilobytes. In a page mode, the instruction memory 121 and the first 64 kilobytes of the external memory overlap. Tags associated with the instructions stored in the instruction cache 222 identify the instructions as having come from the instruction memory 121 or the external memory. Under such circumstances, it is important that the instruction cache not contain instructions that are from a page other than the one from which instructions are being loaded, else program logic is defeated.

Accordingly, when the DSP 100 is directed to switch between the instruction memory 121 and the external memory (either from the instruction memory 121 to the external memory or from the external memory to the instruction memory 121), a hardware signal resets the valid data flags associated with each of the lines of instructions in the instruction cache to indicate that all of the lines are invalid. This causes the instruction prefetch state machine (226 of FIG. 2) to act in a normal fashion to fill the instruction cache from the currently designated memory (either the instruction memory 121 or the external memory).

As stated above, the present invention employs a hardware scheme to invalidate the instruction cache when necessary to do so. Using hardware, rather than a software routine, to invalidate the instruction cache frees the DSP to perform other tasks concurrently with the invalidation and thereby improves the overall performance of the DSP.

Turning now to FIGS. 5A and 5B, illustrated are flow diagrams of a method of managing memory carried out according to the principles of the present invention. A first method, generally designated 500, begins in a start step 505. A request begins in a step 510, wherein a load request is issued (assertion of the iu_miu_load_req signal) and an associated address is placed on the iu_miu_addr address bus. The external memory interface responds in a step 515 by acknowledging the request (assertion of the miu_iu_ issued signal). When return instructions are available, the external memory interface asserts a signal miu_iu_done in a step 520 and concurrently places the associated instructions on the miu_iu_data bus. At this point, the request may be selectively aborted. This is represented by a decisional step 525. If the request is to be aborted, the external memory interface may be stalled before instructions are placed in the instruction cache by signaling the external memory interface with the kill_miu_wb signal and preventing a write to the instruction cache by asserting the lineX_we_n signal. Having been aborted further processing of the request halts and the method 500 ends in an end step 530. Otherwise, the instruction are loaded into the instruction cache from the miu_iu_data bus and the method 500 then ends in the end step 530.

A second method, generally designated 550, begins in a start step 555, wherein a change in the program counter is detected. In a decisional step 560, it is determined whether the DSP is operating in a page mode. If not, the instruction memory and the external memory do not share the same address space, and the instruction cache does not need to be hardware-invalidated. The method 550 thus ends in an end step 565. If the DSP is operating in a page mode, the instruction memory and the external memory are sharing the same address space. Thus, the instruction cache does need to be hardware-invalidated. This occurs in the step 570, and the method 500 ends in the end step 565.

Although the present invention has been described in detail, those skilled in the art should understand that they can make various changes, substitutions and alterations herein without departing from the spirit and scope of the invention in its broadest form.

What is claimed is:

1. For use in a processor having an instruction cache, an instruction memory and an external synchronous memory, a memory management mechanism, comprising:
   an external memory request abort circuit, coupled to said external memory, that aborts a request to load an instruction from said external memory before said information is loaded into said instruction cache; and
   an instruction cache invalidator, associated with said external memory request abort circuit, that invalidates said instruction cache when address spaces of said instruction memory and said external memory overlap and said processor switches between said instruction memory and said external memory.

2. The mechanism as recited in claim 1 further comprising an instruction prefetch mechanism that prefetches instructions from a selected one of said instruction memory and said external memory into said instruction cache.

3. The mechanism as recited in claim 1 wherein said instruction cache is direct mapped.

4. The mechanism as recited in claim 1 wherein said external memory request abort circuit is associated with a request arbiter in said processor.

5. The mechanism as recited in claim 1 wherein said instruction cache invalidator comprises a programmable control register.

6. The mechanism as recited in claim 1 wherein said processor is a digital signal processor.

7. A method of managing memory in a processor having an instruction cache, an instruction memory and an external synchronous memory, said method comprising:
   aborting a request to load an instruction from said external memory before said information is loaded into said instruction cache; and
   invalidating said instruction cache when address spaces of said instruction memory and said external memory overlap and said processor switches between said instruction memory and said external memory.

8. The method as recited in claim 7 further comprising prefetching instructions from a selected one of said instruction memory and said external memory into said instruction cache.

9. The method as recited in claim 7 wherein said instruction cache is direct mapped.

10. The method as recited in claim 7 wherein said external memory request abort circuit is associated with a request arbiter in said processor.

11. The method as recited in claim 7 wherein said invalidating comprises toggling a flag in a programmable control register.

12. The method as recited in claim 7 wherein said processor is a digital signal processor.

13. A digital signal processor, comprising:
   an execution core having an instruction cache;
   a memory unit coupled to said execution core and having an instruction memory and an external synchronous memory;
   an external memory request abort circuit, coupled to said external synchronous memory, that aborts a request to load an instruction from said external synchronous memory before said information is loaded into said instruction cache; and
   an instruction cache invalidator, associated with said external memory request abort circuit, that invalidates said instruction cache when address spaces of said instruction memory and said external synchronous memory overlap and said processor switches between said instruction memory and said external synchronous memory.

14. The digital signal processor as recited in claim 13 further comprising an instruction prefetch mechanism that prefetches instructions from a selected one of said instruction memory and said external synchronous memory into said instruction cache.

15. The digital signal processor as recited in claim 13 wherein said instruction cache is direct mapped.

16. The digital signal processor as recited in claim 13 wherein said external memory request abort circuit is associated with a request arbiter in said processor.

17. The digital signal processor as recited in claim 13 wherein said instruction cache invalidator comprises a programmable control register.

* * * * *